June 25, 1968  R. H. ST. JOHN  3,389,931
CONNECTOR MEANS FOR ATTACHING COMPONENTS
INTO AN INTEGRAL STRUCTURE
Filed April 24, 1967  2 Sheets-Sheet 1

INVENTOR.
RAYMOND H. ST. JOHN
BY
ATTORNEY

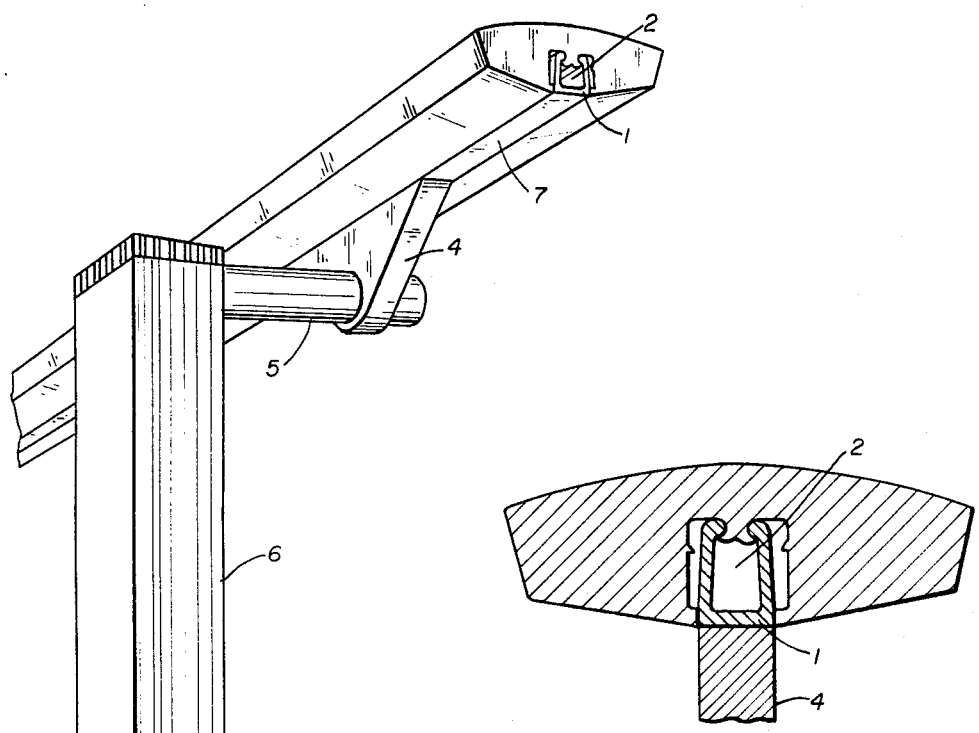
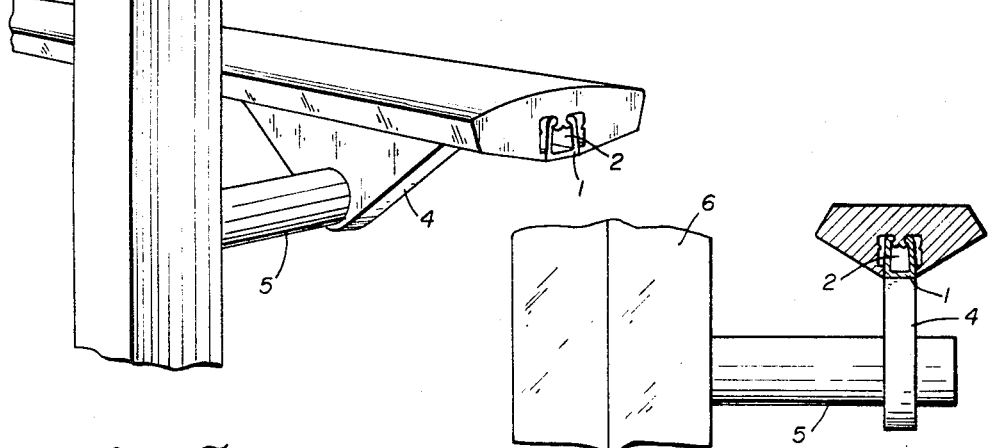

United States Patent Office 3,389,931
Patented June 25, 1968

3,389,931
CONNECTOR MEANS FOR ATTACHING COMPONENTS INTO AN INTEGRAL STRUCTURE
Raymond H. St. John, 5103 E. 9th St.,
Tulsa, Okla. 74112
Filed Apr. 24, 1967, Ser. No. 632,976
2 Claims. (Cl. 287—189.36)

ABSTRACT OF THE DISCLOSURE

A connector means suitable for use in inter-connecting structural members in an assembly of ornamental railing, the connector means each being a part of the body of the structural members being joined and each connector means being essentially U-shaped in configuration. One of the U-shaped means having flexible arms and the other having an central projection in the base thereof to cooperate with the free ends of the flexible arms, and requiring no additional connecting components to hold the structure together as a unit.

---

Many types of fasteners and connectors as such are used and are well known in the ornamental metal industry field. Some of the fasteners and connectors are simple, others complicated; some are limited to only one application, while others which have different applications require many components to operate. For instance, the patent to Blum, No. 2,807,834, issued Oct. 1, 1957, which is an anchor-type fastening means, requires a screw to hold the segments of the anchor in place. The patent to Blum, No. 2,873,095, issued Feb. 10, 1959 (note FIGURE 2) discloses somewhat the same principal as taught in Patent No. 2,807,834 issued Oct. 1, 1957 (note FIGURE 12). Both of these patents require one or more screws to securely interlock the component parts. The patent to Michael No. 2,833,522, issued May 6, 1958, shows a fastener means adaptable for interconnecting components in a railing composite. This fastener to be secured requires a rod wedge and a screw to hold the fastener in place. There are many other variations of fasteners adaptable as interconnectors; however, the connector means which I shall disclose does not require additional components or screws for secure connections.

The main object of this invention is to provide a new and improved connecting means for extruded metal members wherein one of the connectors is integral with a first member and aligned in a slot to connect to a second connector which is integral with a second member, the connectors becoming part of the structure itself and requiring no additional connecting components to secure the unity of the structural members into a rigid structure.

Another object of this invention is to provide an easy means of assembling extruded members in a rigid structure by bringing the members to be joined into a composite structure without the use of additional components.

Other objects and merits of this invention will become apparent from the disclosure.

FIGURE 4 shows a cross-section of the connector means joining a metal bracket and a metal rail into a single unit.

FIGURE 5 is an isometric view showing the connector means in a bracket and hand rail assembly.

FIGURE 6 is a sectional view of the snap-in feature of the connector means showing a bracket in combination with a rail member.

Extruded metal railing presently used in architectural construction today usually includes a slotted longitudinal section in the bottom of the rail, especially in aluminum rails. There are many varied shapes and types of slots available. However, the present invention contemplates extruded railing structure with a special longitudinal slotted section on the lower side of the rail, details of which shall follow. The railing slotted section used in this application is unique in that the slot provides a special type of opening in the lower side for inserting connector means. The lower segment of the slot is made up of two square abutments, each of which are joined to the lower end of the approximately parallel sides of the slot. Each of the abutments extends inwardly to form an opening for insertion of the connector means. With this design, the abutments provide a supporting surface when the connectors are in place. On the upper inner surface of the slotted area in approximately the center of the surface is provided a projection in the shape of two partially rounded surfaces back to back with indentations in each side of the projection. The indentations are located between the partially rounded surfaces and the top surface of the slot to hold securely through tension the connector which fits over the rounded section.

Figure 1:
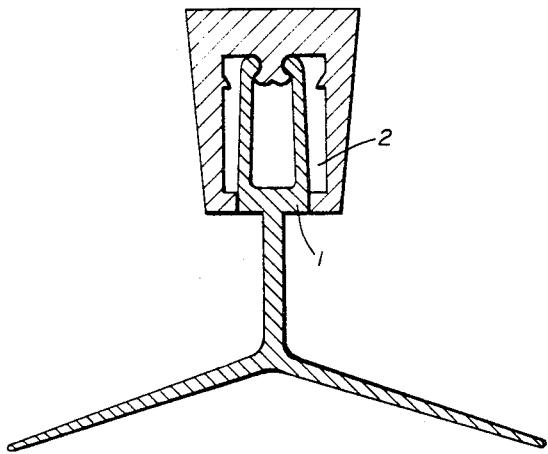
FIGURE 1 illustrates a cross-sectional view of the connector means in a closed position in place in the slotted section of a structural member.
Figure 2:
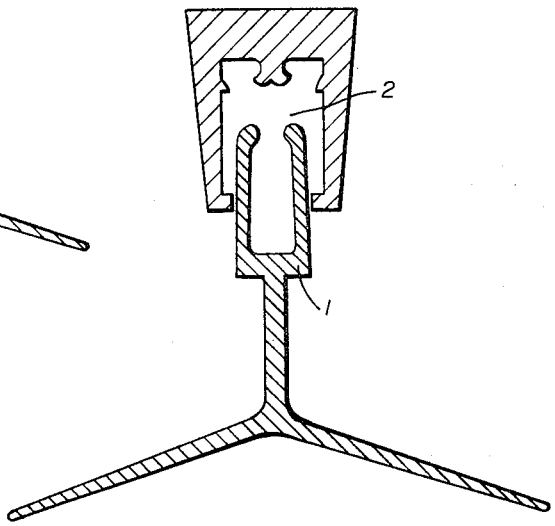
FIGURE 2 illustrates a cross-sectional view of the connector means in an open position in a slotted section of a structural member.

The structure of the slotted section in combination with the connector is shown in FIGURE 1 in a closed position. The connector 1 is shown in an open position in FIGURE 2. The connector which is in the form of a three-sided hook is an integral part of an extruded member or a post section, all of which is fabricated to be joined to another extruded member or a rail assembly, whatever the application needs are. As was stated previously, the connector is attached or is integral with a section which is to be connected to another section. The design features of the connector are fashioned to form two approximately parallel sides which are joined together in the lower section of the connector at right angles to form a slot and a third side, integral with the structure which is to be attached to some other section. The third side is dimensioned precisely so as to fit tightly into the opening in the longitudinal slot of the other section to be joined. The approximately parallel sides which form the sides of the connector are beaded on the inner side at their respective ends so that when the connector is placed in position in the slotted section as shown in FIGURE 1, the beaded ends slide over the protruding projection and, through tension created by the parallel sides, fall in place. The connector when in place aligns the extrusions being connected together in perfect alignment.

Figure 3:
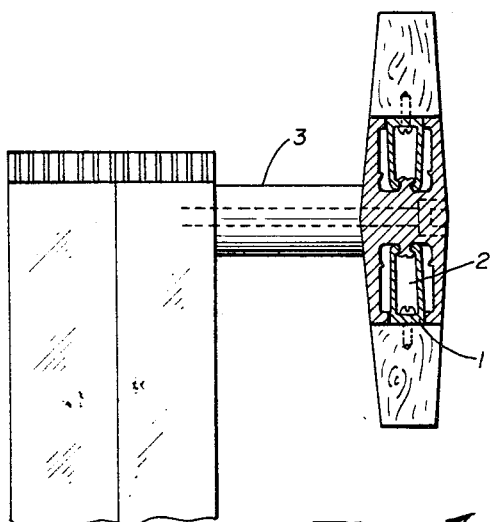
FIGURE 3 is a cross-sectional view showing the connector means between a metal bracket with a slotted section and wood trim of a railing assembly.

The versatility of this connector is further shown in FIGURE 3. In this illustration, the connector is used as a means to connect wood trim and an aluminum base into an integral unit. In this illustration, the wood trim forms the railing of a railing assembly.

FIGURE 4 illustrates the use of the connector means in assembly of a metal bracket and a metal rail. In this particular application, the connector 1 is part of an extrusion and is located on top of the bracket. By placing the slotted section 2 of the rail structure directly over the top of the bracket, the two members are joined to form an integral member. The two members being joined fit into a precise union so that the use of a wedge with screws, or screws themselves, to firmly secure the members is unnecessary. The bracket 4 for the rail is mounted on a member 5 which is connected to a post or a wall area 6.

FIGURE 5 shows the use of the connector 1 which is part of the extrusion, in place in the slot 2 in an extruded bracket and rail system of assembly. The filler strip 7 which is shown snapped into place in the longitudinal slot extends to the bracket 4. At this point, bracket 4 is snapped into place in the longitudinal slot, following this additional filler strips with the connector means are put in place in the slotted section 2. Naturally, in a long railing section such as is shown, the connector locks into the slotted section so that the separation of the railing and the brackets once they are locked into position is virtually impossible. The connector 1 as shown here is a longitudinal extension running the full length of the railing. At intervals, the connector is integrally attached to a bracket 4 in combination with a supporting member 5 extending from the post 6. The balance of the longitudinal slot is completely sealed by the use of filler strips 7. The illustration presented here is typical of the decorative guard rails or separations used in modern architecture.

FIGURE 6 portrays the ease with which the connector means integral with a bracket 4 is placed into the rail assembly longitudinal slot.

What is claimed is:

1. A structural connector for connecting extruded members wherein the structural connector comprises a longitudinal slot separating two approximately parallel sides of the said connector, with beads on each of the inner edges of one end of said sides, the said sides joining each other on the other end to form a third side integral with one of the structural members to be joined; a second longitudinal slot located in a second structural member to be joined, the second longitudinal slot having two approximately parallel sides with an abutment on each of two outer ends of the sides and the two parallel sides joining each other on the other end forming a third side integral with the said second structural member, the third side having a projection centrally located on the inner surface, the said projection having a surface with two rounded corners and an indentation between the rounded corners and the inner surface of the said third side, the said abutments having flat surfaces and being spaced so as to firmly support the said connector through tension when it is in a locked position in the longitudinal slot of the second mentioned structural member.

2. The structural connector as claimed in claim 1 where each of the two abutments of the second mentioned longitudinal slot act as guides for guiding the said structural connector into position in the second longitudinal slot.

References Cited

UNITED STATES PATENTS

| 2,150,130 | 3/1939 | Ragsdale et al. | 256—65 |
| 2,833,522 | 5/1958 | Michaels | 256—65 |
| 2,904,314 | 9/1959 | Thom | 256—65 |
| 3,239,196 | 3/1966 | Blum et al. | 256—67 |
| 3,304,683 | 2/1967 | Ferreira | 256—65 |

FOREIGN PATENTS

| 1,135,901 | 12/1956 | France. |
| 1,245,055 | 9/1960 | France. |

MARION PARSONS, JR., *Primary Examiner.*